United States Patent [19]

Hou et al.

[11] 4,025,928
[45] May 24, 1977

[54] UNITARY INK JET AND RESERVOIR

[75] Inventors: Shou L. Hou, Barrington; James D. Beasley; Donald J. Koneval, both of Arlington Heights, all of Ill.

[73] Assignee: Gould Inc., Rolling Meadows, Ill.

[22] Filed: Apr. 19, 1976

[21] Appl. No.: 678,062

[52] U.S. Cl. .......................................... 346/140 A
[51] Int. Cl.² ...................................... G01D 15/18
[58] Field of Search .............. 346/140 R, 140 A, 75

[56] References Cited

UNITED STATES PATENTS

| | | | |
|---|---|---|---|
| 2,678,633 | 5/1954 | Holden | 346/140 A |
| 3,120,214 | 2/1964 | Stegenga | 346/140 A |
| 3,683,212 | 8/1972 | Zoltan | 346/140 R X |
| 3,823,409 | 7/1974 | Carrell | 346/140 R |

*Primary Examiner*—Joseph W. Hartary
*Attorney, Agent, or Firm*—Leydig, Voit, Osann, Mayer & Holt, Ltd.

[57] ABSTRACT

An impulse ink jet mounted in an ink reservoir so as to be a self-contained writing device for X-Y and strip chart process recorders and table top graphic recorders, with the jet being associated with a length of energy absorbing conduit coiled within the reservoir so as to minimize the effects of acceleration on the ink; the conduit allowing the ink jet to achieve a flat response to the driving pulse rate through its full response range.

4 Claims, 5 Drawing Figures

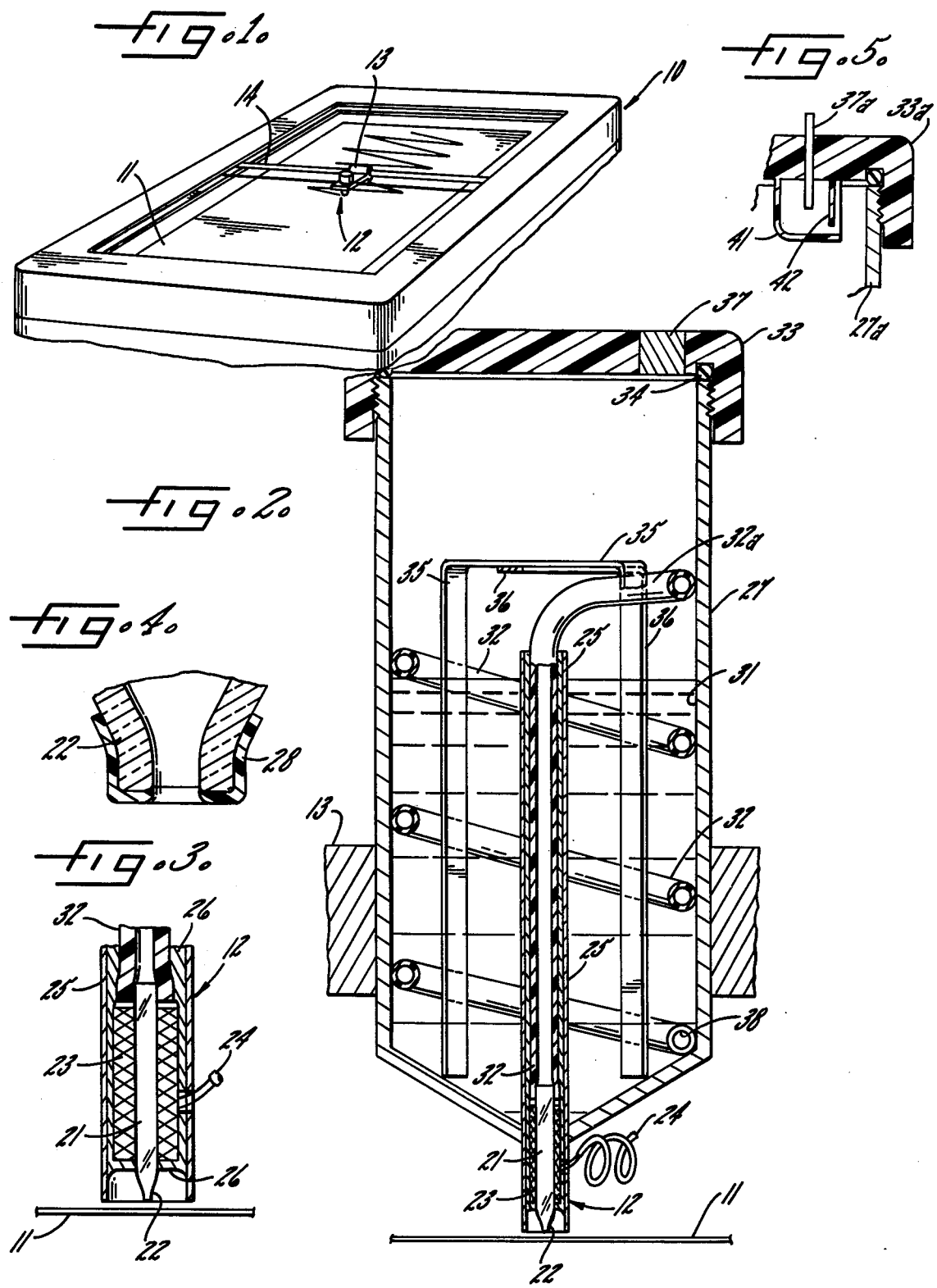

UNITARY INK JET AND RESERVOIR

This invention relates generally to ink jet writing devices and more particularly concerns an ink jet device suitable for use with X-Y and strip chart process recorders or similar table top graphic instruments.

Non-contact writing devices which produce traces by ejecting droplets of ink against the medium being printed upon are well known as ink jets to the art. One class of such devices is the impulse ink jet in which ink droplets are ejected upon an electrical signal or at a rate dictated by a signal frequency. Devices of this kind are disclosed and claimed in U.S. Pat. No. 3,683,212 issued Aug. 8, 1972, and its related divisional U.S. Pat. Nos. 3,840,758; 3,857,049 and 3,902,083.

Adapting an ink jet writing device for the moving writing head of an X-Y recorder type of instrument involves some special problems arising from the need to feed ink to the ink jet without visually obscuring the recording paper and without interfering with the mechanism for driving the writing device along the two controlled axes. Moreover, modern X-Y recorders are capable of high speed response so that the writing device must function properly under high acceleration and deceleration forces. In the case of an impulse ink jet device, such acceleration forces should not cause ink to be thrown when there is no command signal.

Impulse ink jets embody another problem whose solution creates a further difficulty in adopting such devices to an X-Y recorder. To prevent pressure pulse reflections from interfering with subsequent ink droplet formation, and thus insure that a single uniform droplet is generated by each impulse signal through the full response range, an energy absorbing viscoelastic conduit can be associated with the droplet forming tube as taught in U.S. Pat. No. 3,832,579, issued Aug. 27, 1974. Although the conduit and the droplet forming tube are of capillary diameters, a relatively appreciable length of conduit, on the order of six inches, is utilized to prevent pulse reflections. By so providing uniform droplets regardless of frequency, the forming of uniform traces through proper frequency modulation is facilitated. Such frequency modulation is disclosed and claimed in United States patent application Ser. No. 639,644, filed Dec. 11, 1975, and assigned to the assignee of the present invention. Providing this structure within the space limitations, and subject to the operating forces, of an X-Y recorder presents a further problem of adapting an impulse ink jet writing device to this application.

It is the general aim of the invention to solve the above problems and provide an impulse ink jet writing device well suited for X-Y recorder type instruments.

In more detail, it is an object of the invention to provide a writing device of the above character that is capable of functioning properly, including the maintaining of a flat frequency response, when driven at high speed and subjected to severe acceleration and deceleration shocks.

A further object is to provide a device of the above type which can be mounted for writing in a plane varying from horizontal to vertical.

Another object is to provide a device as described above which is simple in design and hence economical to manufacture and maintain.

Other objects and advantages of the invention will be apparent upon reading the following detailed description and upon reference to the drawings, in which:

FIG. 1 is a fragmentary perspective of an X-Y recording instrument embodying the writing device of the invention;

FIG. 2 is an enlarged fragmentary section of the ink jet device shown in FIG. 1;

FIG. 3 is a greatly enlarged vertical section of the device shown in FIG. 1;

FIG. 4 is a further enlarged fragmentary section of the nozzle portion of the ink jet shown in FIG. 3; and FIG. 5 is a fragmentary section showing an alternate embodiment for the cover air vent shown in FIG. 2.

While the invention will be described in connection with certain preferred embodiments, it will be understood that we do not intend to limit the invention to those embodiments. On the contrary, we intend to cover all alternatives, modifications and equivalents as may be included within the spirit and scope of the invention as defined by the appended claims.

Turning to the drawings, there is shown in FIG. 1 the writing table of an X-Y recorder 10 on which a sheet of recording paper 11 is fixed. A writing device 12 embodying the invention is mounted on a head 13 that can be driven along an axis bar 14. The bar 14, in turn, is mounted for movement perpendicular to its length over the table and thus the paper 11. The device 12 is positioned to trace a line on the paper as the bar 14 moves, and as the head 13 moves on the bar. As those familiar with this art will appreciate, a signal having two X-Y components is plotted by the recorder 10 by having one component drive the bar 14 and the other component drive the head 13 on the bar.

The writing device 12 is of the kind shown in U.S. Pat. No. 3,683,212, referred to above, and includes an orifice defining member 21 in the form of a glass tube with a necked down lower end 22 surrounded by a piezoelectric transducer 23 that, when energized by an electrical pulse transmitted by leads 24, ejects a droplet of ink from the orifice at the lower tube end 22. By ejecting ink droplets at a rate proportional to the movement of the device 12 over the paper 11, a continuous uniform line is traced. Systems for so modulating the ink droplet ejection rate are shown in said application Ser. No. 639,644. The tube and transducer are fixed in a cylindrical shroud 25 by putting material such as a silicone polymer 26, and the tube 21 is held perpendicular to the plane of movement of the device 12 by the shroud 25 being fixed in a housing 27 that, in turn, is fixed in the head 13. The housing 27 serves as an ink reservoir for the writing device 12.

To prevent ink creeping from the jet orifice at the lower tube end 22, in the event that a positive pressure is developed in the housing 27, the end 22 is coated with an anti-wetting material 28 (see FIG. 4) such as tetrafluoroethylene.

To give a clearer understanding of the representative embodiment and the problems involved, a modern X-Y recorder is capable of driving its writing head at speeds of up to 50 inches per second, with acceleration forces being generated of up to 10 G's. In a practical embodiment, the orifice of the writing tube 21 is approximately 2–3 mils in diameter, and the diameter of the housing 27 is only approximately one-half inch. One potential problem is avoided by holding the tube 21 perpendicular to its direction of movement, so that the high acceleration forces will not act to throw ink in the tube through the droplet forming orifice.

In accordance with the invention, the housing 27 defines a cylindrical chamber 31 containing ink, and a viscoelastic conduit 32 is connected to be open to the tube 21, is run up through the shroud 25, and is coiled within and against the walls of the chamber 31. Preferably, the conduit is on the order of six inches long so as to follow the teachings of U.S. Pat. No. 3,832,579 referred to above. The chamber is closed by a sealing cover 33 including an annular seal 34 to prevent ink leakage and an air vent 37 to prevent vacuum blocking of ink flow through the device 12. The vent 37 is a plug of air porous, non-wetting plastic such as tetrafluorethylene. The conduit 32 is of capillary size and coiled helically from near the top of the chamber 31 down to the chamber bottom so that the conduit open end 38 will be near the lowest point of the ink supply and can therefore deliver virtually all of the ink in the chamber to the tube 21.

In order to restrain the conduit 32 and maintain its coiled shape against acceleration forces, a pair of resilient bands in the form of U-shaped springs 35 and 36 are compressed within the conduit coils so as to bias the coils outwardly against the cylindrical wall of the chamber 31, thus maintaining the helical configuration of the conduit 32 even under acceleration forces. The springs 35, 36 are disposed at right angles to one another.

Although a relatively appreciable length of conduit 32 is used — appreciable with respect to the sizes of the associated parts — because the conduit is coiled on a uniform diameter, acceleration forces on the ink in the conduit, no matter in what direction those forces are acting, are essentially balanced, except for a short length of conduit 32a extending almost radially from the shroud 25 to the wall of the chamber 31. In the illustrated embodiment, the length of the conduit portion 32a is only about one-fourth inch. It can be calculated that with an orifice of 2 mils in the tube 21, the ink meniscus at the orifice could support an ink column in the tube 21 and associated conduit 32 on the order of about 15 inches. This means that the device 12, with an unbalanced length of ink carrying conduit of only approximately one-fourth inch, could theoretically withstand acceleration forces of 60 G without throwing ink — well above the actual forces imposed by a typical X-Y recorder.

Preferably, the vent 37 is located toward one edge of the cover, at the right in FIG. 2, so that the vent will be near the uppermost part of the assembly upon rotation of the device 12 counterclockwise as seen in FIG. 2 through an angle of up to 90°. The device can therefore be positioned so as to write in planes varying from horizontal to vertical. An alternate form of vent is shown in FIG. 5 where parts similar to those previously described have been given the same reference numerals with the distinguishing suffix $a$ added. Thus, a cover 33a for a housing 27a is provided with a vent 37a in the form of a short tube extending through the cover and having its lower end shielded by baffles including a cup-like member 41 and a plate 42. The vent 37a is positioned, as was the vent 37, toward what would be the uppermost portion of the assembly should the device 12 be rotated so as to write in a vertical plane.

It will now be apparent that the writing device 12 provides an X-Y recorder with an extremely compact writing head that provides the recorder with all of the advantages of an impulse jet writing device. Even though an ink reservoir is carried with and made a part of the writing device, the arrangement of parts is such that acceleration forces do not affect the controlled generation of ink droplets. Those familiar with this art will also appreciate that the design is quite simple and straightforward and hence economical to manufacture and maintain.

We claim as our invention:

1. An ink jet writing device comprising, in combination, a housing defining a cylindrical chamber adapted to be mounted for movement perpendicularly to the axis of said chamber, a tubular shroud fixed substantially on the center line of said chamber and defining an opening from the chamber, an ink jet assembly fixed in said opening and including an orifice defining member and a transducer for expelling droplets of ink from said member through said orifice, a viscoelastic conduit opening to said member, running through said shroud and having a length coiled within said chamber, and means for opening said chamber so as to supply the chamber with ink.

2. The combination of claim 1 in which said opening is in the bottom of said chamber and said shroud extends from said opening to a point close to the top end of said chamber, and said conduit length extends vertically through said shroud and is coiled helically from near the top of the chamber down to near the bottom of the chamber.

3. The combination of claim 1 including a resilient band compressed within the coils of said conduit and biasing said coils outwardly against the walls of said chamber.

4. The combination of claim 1 in which said chamber is air vented at a point toward one lateral edge so as to avoid ink leakage through the vent and permit the device to write in a vertical plane by rotating the device so that the vent is near the uppermost part of the assembly.

* * * * *